United States Patent Office 3,370,033
Patented Feb. 20, 1968

3,370,033
PROCESS FOR THE PRODUCTION OF BUTADIENE POLYMERS MODIFIED BY AN ISOCYANATE SULFENE CHLORIDE
Josef Witte, Cologne, Stammheim, Nikolaus Schön and Gottfried Pampus, Leverkusen, Hans Holtschmidt, Leverkusen, Steinbuechel, and Helmut Freytag, Cologne, Stammheim, Germany, assignors to Farbenfabriken Bayer Aktiengesellschaft, Leverkusen, Germany, a corporation of Germany
No Drawing. Filed Apr. 29, 1965, Ser. No. 452,001
Claims priority, application Germany, May 12, 1964, F 42,852
7 Claims. (Cl. 260—33.6)

This invention relates to rubbery polymers of conjugated diolefines, particularly to butadiene polymers and to a method for preparing the same.

The preparation of mixtures from usual commercial type of polybutadiene prepared with organometallic catalysts or organometallic mixed catalysts gives rise to considerable difficulties under commercial conditions because the butadiene polymers tend to crumble when worked up in the usual mixing apparatus due to their low adhesiveness and film strength. Moreover, mixtures of pure polybutadiene are difficult to calender and spraying is unsatisfactory. Under technical conditions the commercial types of polybutadiene therefore have to be worked up as blends containing a high proportion of natural rubber or other types of synthetic rubber, such as polyisoprene or styrene-butadiene rubbers. This results in a loss of a part of the special technological properties of polybutadiene vulcanisates, that is their excellent abrasion resistance, good resistance to ageing and good elasticity. These disadvantages are marked in the known types of polybutadiene when mixed with more than 50% of styrene-butadiene rubber or more than 30 to 35% of natural rubber of Mooney value 40 to 45. On the other hand, it is desirable to have as high a proportion of polybutadiene as possible, but a limit is set on this because of the commercial possibilities of working up. To this is added the fact that some types of polybutadiene mixed with crude rubber have a relatively high cold flow which may be a disadvantage when the material is stored.

Therefore, it is an object of the present invention to provide an improved method for the manufacture of rubbery polymers of butadiene. Another object of this invention is to provide a method for preparing butadiene polymers preventing the disadvantages described above in compounding the polymers. Still another object of this invention is to modify butadiene polymers to improve their cold flow.

These and other objects which will become apparent from the following description are accomplished in accordance with the invention, generally speaking, by reacting butadiene polymers containing at least 70% of monomeric butadiene units with 0.01 to 0.5% by weight of an aromatic isocyanate sulphene chloride, and if desired, reacting thereafter the product obtained with approximately the equivalent quantity of an aliphatic or aromatic diamine.

The butadiene polymers useful in the present invention are known in the art and prepared in the usual manner in aliphatic or aromatic solvents. Any butadiene polymer is useful in this invention which is prepared by solution polymerisation of butadiene and if desired other copolymerisable compounds in the presence of organometallic catalysts or mixed catalysts. The polymers useful in the present invention contain at least 70% by weight and up to 100% by weight monomeric butadiene units.

Examples of compounds capable of further copolymerisation are styrene and styrenes which are substituted by alkyl or halogen in the phenyl radical.

Organometallic catalysts include lithium alkyls or mixed catalysts such as $TiCl_4/I_2Al(C_4H_9)_3$, $TiCl_4/I_2/Li[Al(C_4H_9)_4]$ $TiI_4/Al(C_4H_9)_3$, $TiI_3OC_4H_9/Al(C_4H_9)_3$ and $CoCl_2 \cdot pyridine/Al(C_2H_5)_2Cl$. Examples of aliphatic or aromatic solvents are hexane, cyclohexane, benzene, toluene, ethyl benzene, xylene.

The isocyanates containing a sulfenyl halide group, that is the isocyanato sulphene chlorides may be represented by the following general formula: X—S—R—NCO wherein R is a divalent organic radical having from 1 to 16 carbon atoms. Thus, R in the above formula may be substituted or unsubstituted and may be an alkylene radical, an arylene radical, an alkarylene radical, an aralkylene radical, and so forth. Aromatic radicals are preferred. X is halogen radical having an atomic number between 17 and 35, inclusive. Other substituents which may be connected to the organic group R above are halogen groups, nitro groups, alkyl groups, cycloalkyl groups, alkoxy groups, aralkoxy groups, and cycloalkoxy groups. In addition to the above groups, sulfide radicals containing alkyl, aryl or cycloalkyl groups may also be connected to R above.

These aromatic isocyanato sulphene chlorides are prepared as described in U.S. application Serial No. 433,469 filed February 17, 1965.

The following isocyanate sulphene chlorides are mentioned by way of example for the process of the invention

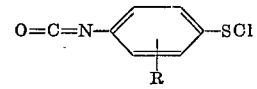

R=hydrogen, alkyl- (such as methyl, isobutyl), cycloalkyl-, aryl, alkoxy- (such as methoxy ethoxy), halogen- (such as chlorine) or nitro groups.

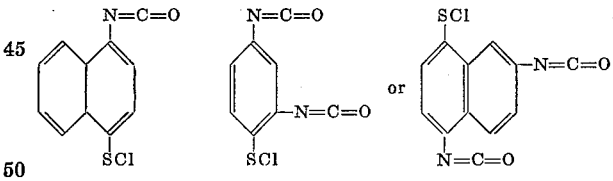

Further useful examples of isocyanates are described by way of their preparation in the afore-mentioned U.S. application.

The butadiene polymer reacts very rapidly in solution with the sulphene chloride group of the isocyanate sulphene chloride even at room temperature and below.

A preferred temperature range in practice is —20 to +100° C. By thoroughly mixing the reaction components it is possible to control the number of isocyanate sulphene chloride molecules which react with a butadiene macromolecule within only narrow limits.

The isocyanate sulphene chloride may be mixed in by adding a dilute isocyanate sulphene chloride solution (e.g. 0.1 to 1%) dropwise into the vigorously stirred polybutadiene solution. The solvents can be the same as those used in the polymerisation of the butadiene, such as toluene. 0.01–0.5 part by weight of isocyanato sulfenyl chloride are employed for 100 parts by weight of butadiene polymer.

In one method which is preferred for commercial operation, the polybutadiene solution is circulated, by means of a pump, in a vessel equipped with stirrer and circulating duct, and the isocyanate sulphene chloride solution is dosed into the cycle.

The output of the circulating pump and of the dosing pump are so adjusted with relation to each other that the required quantity of isocyanate sulphene chloride is dosed into the cycle during one circulation of the polybutadiene solution. The polybutadiene solution treated in this way can now be stabilised with the usual stabilisers such as 2:6-di-tertiarybutyl-4-methylphenol, 2:2'-dihydroxy-3:3'-ditertiary butyl 5:5'-dimethyldiphenylmethane and β-phenylnaphthylamine, and worked up by steam distillation of the solvent. The lumps of rubber obtained are dried in known manner.

A modification of the process consists in reacting the polymer solution with aliphatic or aromatic diamines prior to stabilisation and working up, the quantity of diamine being so calculated that the number of amino groups is substantially equivalent to the isocyanate group put into the reaction. Examples of suitable diamines are tetramethylene diamine, hexamethylenediamine p-phenylenediamine, toluylenediamine, cyclohexylene-diamine and benzidine. Aliphatic diamines are preferred.

In the process according to the invention, the Mooney value of the butadiene rubber increases by about 10 Mooney units per 0.1% of isocyanate sulphene chloride (calculated on the quantity of polybutadiene put into the reaction).

The process according to the invention is also suitable for the production of butadiene polymers blended with oil.

It is known that synthetic rubber (styrene-butadiene rubbers) having a high molecular weight (types having high Mooney values) can be blended with large quantities of plasticiser oil (up to 100% and more). Vulcanisates produced from such oil blends are largely similar in their technological properties to oil-free types of vulcanisates with correspondingly low Mooney values.

The properties for working up and the properties of the vulcanisate are better the more uniformly the oil is distributed in the rubber. For this reason, the oil is usually added as such or in emulsion to the synthetic rubber latex prior to working up. It was therefore obvious to blend plasticising oils into high molecular weight polybutadiene which had been produced by solution polymerisation with organometallic catalysts and which had excellent properties in the vulcanisate (strength, elasticity, abrasion resistance) but which was very difficult to work up. A very uniform oil/rubber distribution is obtained by adding the oil to the polymer solution.

However, it has been found in practice that the extremely poor properties for working up of very high molecular weight polybutadiene is not improved to a sufficient extent in those mixtures, which are of special interest commercially and which apart from polybutadiene and oil contain only a small quantity of natural rubber or styrene-butadiene rubber. In addition, in oil-free polybutadiene, the high cold flow of such polybutadiene-oil blends has a disadvantageous effect on stacking and storing.

It is found that the process according to the invention, with or without the addition of diamine, results in excellent properties for working up and a very low cold flow even in polybutadiene that are blended with oil and even when blended with only very small quantities of foreign elastomers.

No difficulties arise either in the preparation of the mixture or in calendering or spraying. Suitable plasticisers are the paraffinic, naphthenic or aromatic mineral oils usually used for working up rubber, as well as vegetable oils such as linseed oil. The value of the oils may, with advantage be classified according to a so-called viscosity-density constant (VDC), more or less according to the following grades:

| Viscosity-density constants: | Type of oil |
|---|---|
| 0.790–0.819 | Paraffinic. |
| 0.820–0.849 | Slightly naphthenic. |
| 0.850–0.899 | Naphthenic. |
| 0.900–0.949 | Slightly aromatic. |
| 0.950–0.999 | Aromatic. |
| 1.000–1.049 | Highly aromatic. |
| 1.050 | Extremely aromatic. |

These oils are added to the polymer solution in quantities of 20 to 120 parts, preferably 30 to 70 parts, for 100 parts of butadiene polymer, after the reaction with isocyanate sulphene chloride and if desired with the diamine and before the working up.

The products of the process, whether or not blended with plasticiser oils, show a marked improvement in working up and a very low cold flow. Compared with known butadiene polymers of the same molecular weight (Mooney value), the working up in the kneading apparatus and on rollers is markedly improved; the lifting of the rubber sheet off the roller often observed in the preparation of a mixture of commercial polybutadiene is largely eliminated.

In addition, calendering is much better owing to improved cohesiveness, which is of major importance for ensuring smooth production.

Especially surprising, however, is the excellent sprayability of the tire tread compounds produced with the use of the polybutadiene obtained by the process of the invention. The spraying qualities of mixtures prepared from the polybutadiene that has hitherto been customary are quite inadequate for technical requirements, especially if the polybutadiene content is high or if butadiene polymers of high molecular weight are used. If, on the other hand, butadiene polymers which have been after-treated according to the invention are used, tread surface compositions which have excellent sprayability are obtained even if the polybutadiene content is high or if polymers of high molecular weight (Mooney 50 to 60) are used.

EXAMPLE (a) *Preparation of the butadiene-polymer*

0.328 part of aluminium triisobutyl and a solution of 0.137 part of titanium butoxy triiodide and 0.052 part of titanium tetrachloride in 3 parts of toluene are added with stirring at 15° C. to a solution of 100 parts of butadiene in 200 parts of toluene in an autoclave, with exclusion of air and moisture. Polymerisation sets in at once, the reaction temperature is kept below 40° C. by cooling. After two hours the extent of the reaction is 96%.

(b) *Comparison test (A)*

A part of the solution is treated with 0.5 part of 2:2'-dihydroxy - 3:3'-di-tertiary butyl-5:5'-dimethyl-diphenylmethane and 2 parts of disproportionated resinic acid calculated on 100 parts of polymer. The toluene is distilled off by introducing the solution into water which is at a temperature of 95 to 98° C. and which contains 0.001% of a copolymer of isobutylene and maleic acid. The polybutadiene, which is obtained in lumps, is dried in vacuo at 50 to 60° C. Mooney viscosity (ML 4', 100°)=38.

(c) *Reaction according to the invention (B–D)*

Three equal parts of the solution prepared according to (a) are each treated with 0.1 part of 2:2'-dihydroxy-3:3'-di-tertiary butyl-5:5'-dimethyl-diphenylmethane, 0.1, 0.2 and 0.4 parts of p-isocyanate-phenylsulphenechloride, each dissolved in 50 parts of absolute toluene, are then added in the course of 20 minutes with stirring. 0.028, 0.056 and 0.122 parts of hexamethylenediamine, each dissolved in 10 parts of absolute toluene, are then stirred into the solution. The product is worked up as under (b).

| Polymer | Initial Mooney | Mooney ML 4', 100° | Cold flow, mg./min. |
|---|---|---|---|
| A | | 38 | 31.4 |
| B | 38 | 45 | 5.1 |
| C | 38 | 61 | 2.5 |
| D | 38 | 110 | 0.0 |

The cold flow is measured in a modified outflow plastometer. The smaller the quantity of rubber leaving per unit time, which is given in mg./min., the better are the values obtained for the cold flow.

Test mixtures of the following composition are prepared from polymers B and C on rollers at 60 to 65° C.:

| | Parts |
|---|---|
| Polymer B or C | 70.00 |
| Natural rubber Defo 600 | 30.00 |
| Carbon black | 48.00 |
| Stearic acid | 2.00 |
| Zinc oxide | 5.00 |
| Cumarone resin | 5.00 |
| Colophony | 2.00 |
| Aromatic mineral oil | 7.50 |
| Paraffin | 0.60 |
| N-phenyl-N-cyclohexyl-γ-phenylene diamine | 0.75 |
| Phenyl-α-naphthylamine | 0.75 |
| Sulphur | 2.00 |
| N-cyclohexyl-2-benzthiacylsulphene amide | 0.90 |

Properties for working up

| Polymer | B | C |
|---|---|---|
| Response to mixing | Good | Good (−). |
| Sprayability at 60/90°: | | |
| Surface T-profile | Smooth | Smooth. |
| Edges T-profile | do | do. |

The mechanical values of the vulcanisates of the mixtures are at the usual level for polybutadienes.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for the preparation of modified butadiene polymers which comprises reacting a butadiene polymer containing at least 70% of butadiene, obtained by solution polymerisation in the presence of organometallic catalysts, with 0.01–0.5 part by weight per 100 parts by weight of polymer of an aromatic isocyanato sulphene chloride.

2. A method for the preparation of modified butadiene polymers which comprises reacting a butadiene polymer containing at least 70% of butadiene, obtained by solution polymerisation in the presence of organometallic catalysts, with 0.01–0.5 part by weight per 100 parts by weight of polymer of an aromatic isocyanato sulphene chloride, and thereafter reacting the product with essentially the equivalent quantity of an organic diamine.

3. A method for the preparation of modified butadiene polymers which comprises reacting (1) a butadiene polymer containing at least 70% of butadiene, obtained by solution polymerisation in the presence of organometallic catalysts and blended with 20 to 120 parts by weight per 100 parts by weight, of butadiene polymer, of a member selected from the group consisting of a paraffinic, naphthenic and aromatic extender oil, with (2) 0.1–0.5 part by weight, per 100 parts by weight of polymer, of an aromatic isocyanato sulphene chloride.

4. A method for the preparation of modified butadiene polymers which comprises reacting (1) a butadiene polymer containing at least 70% of butadiene, obtained by solution polymerisation in the presence of organometallic catalysts and blended with 20 to 120 parts by weight, per 100 parts by weight of butadiene polymer, of a member selected from the group consisting of a paraffinic, naphthenic and aromatic extender oil, with (2) 0.01–0.5 part by weight, per 100 parts by weight of polymer, of an aromatic isocyanato sulphene chloride, and thereafter reacting the product with essentially the equivalent quantity of an organic diamine.

5. A method for the preparation of modified butadiene polymers which comprises reacting (1) a butadiene polymer containing at least 70% of butadiene, obtained by solution polymerisation in the presence of organometallic catalysts and blended with 30 to 70 parts by weight, per 100 parts by weight of butadiene polymer, of a member selected from the group consisting of a paraffinic, naphthenic and aromatic extender oil, with (2) 0.1–0.5 part by weight, per 100 parts by weight of polymer, of an aromatic isocyanato sulphene chloride.

6. A method for the preparation of modified butadiene polymers which comprises reacting a butadiene polymer containing at least 70% of butadiene having been obtained by solution polymerisation in the presence of organometallic catalysts and being blended with 30 to 70 parts by weight per 100 parts by weight of butadiene polymer of a member selected from the group consisting of a paraffinic, naphthenic and aromatic extender oil, with 0.01–0.5 part by weight per 100 parts by weight of polymer of an aromatic isocyanato sulphene chloride, and thereafter reacting the product with essentially the equivalent quantity of an organic diamine.

7. A process for improving the cold flow and compounding of polybutadiene prepared by solution polymerization of butadiene in the presence of an organometallic catalyst which comprises reacting the polybutadiene with 0.01–0.5% by weight of p-isocyanato-phenylsulphenechloride and a similar amount of hexamethylenediamine.

References Cited

UNITED STATES PATENTS

| 3,312,656 | 4/1967 | Einhorn et al. | 260—79.5 |
| 3,232,920 | 2/1966 | Naylor | 260—79.5 |

MORRIS LIEBMAN, *Primary Examiner.*

R. BARON, *Assistant Examiner.*